A. CARDOSO.
ELASTIC VEHICLE WHEEL.
APPLICATION FILED NOV. 25, 1916.
1,298,660.
Patented Apr. 1, 1919.
2 SHEETS—SHEET 1.
Fig. 1
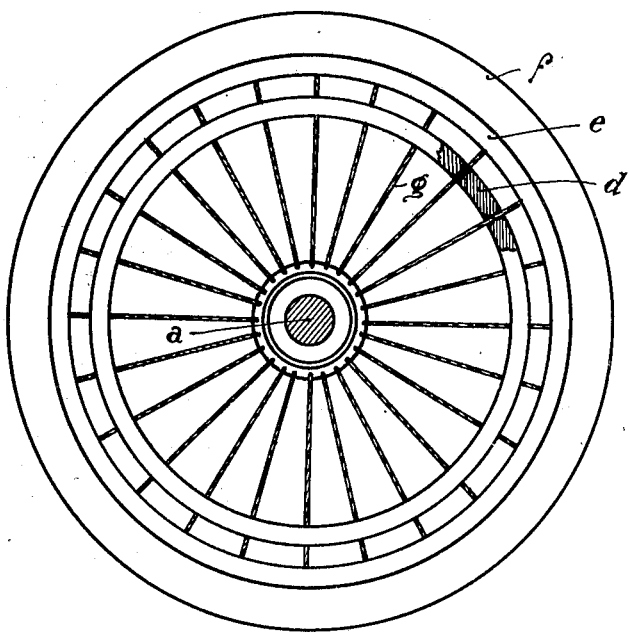
Fig. 2
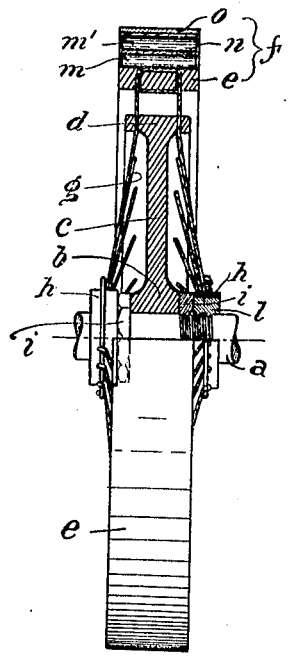
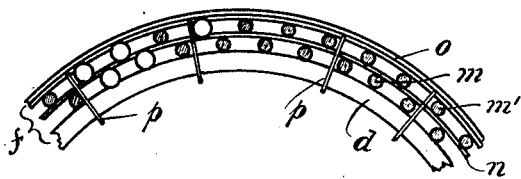
Fig. 3
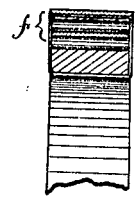
Fig. 4
Inventor:
Adelino Cardoso
per H. W. Plücker
Attorney.

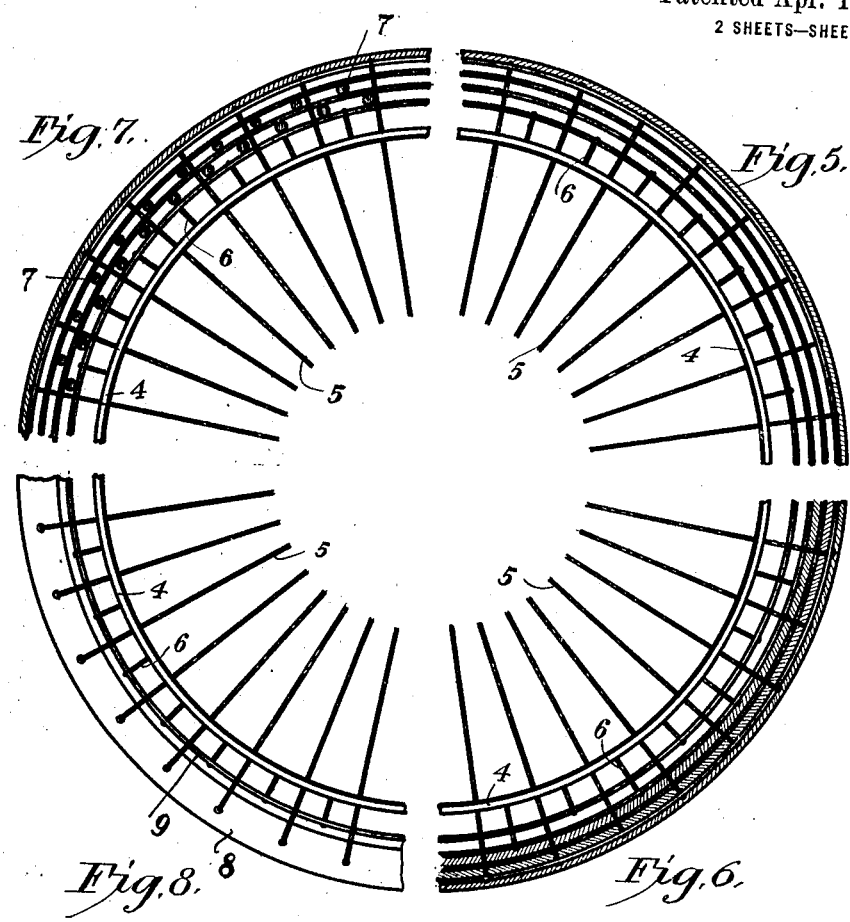

UNITED STATES PATENT OFFICE.

ADELINO CARDOSO, OF MILAN, ITALY.

ELASTIC VEHICLE-WHEEL.

1,298,660.

Specification of Letters Patent.

Patented Apr. 1, 1919.

Application filed November 25, 1916. Serial No. 133,355.

*To all whom it may concern:*

Be it known that I, ADELINO CARDOSO, a citizen of the Republic of Portugal, residing at 4 Piazzale Monforte, Milan, in the Kingdom of Italy, have invented certain new and useful Improvements in Elastic Vehicle-Wheels, of which the following is a specification.

The resilient wheel forming the subject matter of this invention is characterized by the fact that the resilient effect results either from the construction of the rim and the tire or from the subdivision of the nave into two parts fastened to one another by flexible means, either by cords or flexible wires stretched between the rim and the nave or else between the rim and supplementary naves situated at the sides of the nave proper, or finally of a resilient bush arranged between the said supplementary naves and the axle of the wheel, the said devices admitting of being united or else of being applied separately from one another or combined among themselves in any manner whatever.

The accompanying drawings show some constructional forms of the invention given by way of example. Of course the constructional details may vary from those represented and about to be described without going outside the scope of the invention and the appended claims.

Figures 1 and 2 represent respectively a side view partly in section and an end elevation partly in section of a wheel provided with supplementary naves with resilient bushes and with the special connection between these naves and the rim; Fig. 3 shows a method of constructing the rim; Fig. 4 shows the rim of Fig. 3 mounted on a rigid felly; and Figs. 5, 6, 7 and 8 are side elevations of modified wheel structures embodying the invention.

According to Figs. 1 and 2, on the axle $a$ is mounted rigidly a central disk consisting of a nave $b$, web $c$ and a felly $d$. A rim $e$ concentric with the felly and independent thereof is connected by means of steel or other cords $g$ to supplementary naves $h$ situated one on one side and the other on the other side of the nave $b$ and mounted on the axle $a$ through the medium of bushings $l$ of resilient material (india rubber or the like).

The cords or wires $g$ fixed at one of their extremities to one of the said supplementary naves, pass through holes cut in the felly $d$ and then into holes in the rim $e$ there forming a simple or double spiral through the thickness of the rim. Two nuts $i$ mounted on threaded parts of the shaft $a$, serve by being displaced axially to vary the tension of the cords.

Any suitable tread or tire, resilient or otherwise, may be mounted on rim $e$.

According to the arrangement shown in Figs. 2, 3 and 4, the tire consists of a resilient rim $f$, composed of two sets of little rollers $m$, $m'$, arranged transversely of the rim of the wheel, one series, viz: the rollers $m$, being situated between the rim $d$ and a strip or flexible hoop $n$, and the other series, that of the rollers $m'$, between the flexible strip $n$ and a rigid strip, of steel for example, $o$, which constitutes the bearing surface. The radial loops $p$ insure the junction of these various parts, and in binding them together produce the effect that the blade $n$, by forming undulations, prevents the rollers $m$, $m'$ from being displaced along the periphery. They may be on the other hand prevented from being displaced in the direction of their axis by any known means.

The composite rims illustrated in Figs. 5 to 8 respectively comprise a rigid ring 4 traversed by the radial cords 5, which connect it to the nave. In all these structures the ring 4 is connected by means of radial portions of cords 6 or other similar devices to one or more other concentric rings outside the ring 4. The said rings may be kept apart from one another in any suitable manner, as by layers of resilient material (rubber or the like) as shown in Fig. 6, or by rollers as shown in Fig. 7. Fig. 8 shows the application of the arrangement to wheels provided with solid rubber tires, the radial cords 5 being attached to the solid tire 8, while the hoops 4 and 9, threaded or not on the cords 5, are connected to one another by means of the cords 6.

Outside the rim constructed in this manner are applied the covering and the ring of rollers. Other supplementary hoops, analogous to those described, free or fastened in a similar manner, may be added thereto.

What I claim and desire to secure by Letters Patent of the United States is:—

1. A resilient wheel comprising a rigid central disk, said disk being provided with a rim, a tread supporting rim concentric therewith, adjustable naves on each side of the central disk, and cords connecting the tread supporting rim to said naves and guided by the rim of the central disk.

2. A resilient wheel comprising a rigid central disk, said disk being provided with an apertured rim, a tread supporting rim concentric therewith, adjustable naves on each side of the central disk, and stretched cords connecting the tread supporting rim to said naves, said cords passing through the apertures in the rim of the central disk.

3. A resilient wheel comprising a rigid central disk, said disk being provided with an apertured rim, a tread supporting rim concentric therewith, adjustable naves on each side of the central disk, resilient bushings within said naves, and stretched cords connecting the tread supporting rim to said naves, said cords passing through the apertures in the rim of the central disk.

In testimony whereof I affix my signature in presence of two witnesses.

ADELINO CARDOSO.

Witnesses:
B. CARLO FALVOTTI,
ENRICO VERONELLI.